SIDE-OPENING TRAVELING BLOCK AND CROWN BLOCK ARRANGEMENT

Original Filed May 26, 1952 3 Sheets-Sheet 1

INVENTOR.
BURT S. MINOR
BY HIS ATTORNEYS.
HARRIS, KIECH, FOSTER & HARRIS
BY Fore W Harris

SIDE-OPENING TRAVELING BLOCK AND CROWN BLOCK ARRANGEMENT

Original Filed May 26, 1952 3 Sheets-Sheet 2

INVENTOR.
BURT S. MINOR
BY HIS ATTORNEYS.
HARRIS, KIECH, FOSTER & HARRIS
BY Ford W. Harris

SIDE-OPENING TRAVELING BLOCK AND CROWN BLOCK ARRANGEMENT

Original Filed May 26, 1952 3 Sheets-Sheet 3

INVENTOR.
BURT S. MINOR
BY HIS ATTORNEYS.
HARRIS, KIECH, FOSTER & HARRIS
BY Ford W. Harris United States Patent Office Re. 25,730
Reissued Feb. 16, 1965

25,730

SIDE-OPENING TRAVELING BLOCK AND CROWN BLOCK ARRANGEMENT

Burt S. Minor, Whittier, Calif., by Dresser Industries, Inc., assignee, Dallas, Tex., a corporation of Delaware Original No. 2,734,718, dated Feb. 14, 1956, Ser. No. 290,022, May 26, 1952. Application for reissue July 1, 1963, Ser. No. 295,587

13 Claims. (Cl. 254—190)

Matter enclosed in heavy brackets [ ] appears in the original patent but forms no part of this reissue specification; matter printed in italics indicates the additions made by reissue.

This invention relates to apparatus and procedures for running drill pipe and flow tubing into and out of deep wells being drilled or being produced.

In connection with running in and pulling out drill pipe and flow pipe, pipe sections being handled in the derrick, have to be moved quickly between one side of the derrick, where they are stacked, and the center of the well hole, and this movement should be in unison with the movement of the traveling block in order not to interfere with the operations of the latter. Such work requires perfect timing on the port of the crew and a large degree of exertion, and in addition it is quite hazardous.

An object of this invention is to provide apparatus and procedures which will result in the reduction of the work required, the skill to be employed and the hazards involved in the manipulation of the traveling block and pipe sections employed.

Another object of the invention is to reduce the size of some of the equipment from that conventionally employed and to eliminate some of the parts. It is also a general object of the invention to simplify equipment employed for handling drill pipe or flow pipe in a derrick and to simplify the handling procedures, such as eliminating the accurate timing difficulties conventionally required in the use of the traveling block.

A more specific object of the invention is to provide a traveling block structure which is open at one side so that pipe may be moved laterally into a position over the center of the well hole by a simple motion of the crewman and without the necessity for disposing the traveling block initially at any particular point along the length of the pipe or for waiting until the traveling block clears the top of the stand of pipe. Another object is to mount on the traveling block, preferably at its lower end, a pipe hanger or elevator having a cooperating locking jaw which is opened to admit the pipe and which is closed to retain the pipe collar on a suspension seat of the elevator.

By the indicated structure, it is possible to eliminate in the traveling block combination the long extensions to the elevators which are commonly used and the swivel hook commonly used. Since each of these has a length of approximately eight feet, such elimination results in an over-all length reduction of the traveling block combination of around fifteen feet, and consequently a corresponding reduction in the height of the derrick is possible. At the same time commensurate reduction in the length of the wire line employed is possible.

It is also an object of this invention to arrange the sheaves of the traveling block hereof and the sheaves of the crown block typically used in the top of the derrick for optimum reeving of the wire suspension line or cable, so that the traveling block is balanced to reduce its tipping, when being raised or lowered, due to the difference in tension between the tight and loose ends of the line, that is between the end of the line running to the draw works and the end of the line, known as the "dead line," connected to an anchor. I have discovered that, by employing sheaves which are equal in diameter in both the traveling block and the crown block, minimum line wear is effected, and, when this is accomplished by means of a cross-over system of reeving to balance the traveling block, optimum operating conditions are attained.

In connection with the present side-opening traveling block, construction of the block is facilitated if the two sets of traveling block sheaves at opposite sides of the middle are disposed at an angle to each other. To accomplish optimum reeving with this form of traveling block, a similar angular disposition of two sets of intermediate sheaves in the crown block also is employed.

It is therefore a further object of this invention, not only to employ sheaves of equal diameters in the traveling block and the crown block, but also to arrange groups of sheaves in the two blocks to correspond in angular position whereby to insure optimum reeving conditions.

A further object is to provide for disposition of the sheaves of the crown block so that their outermost points from which the wire line is suspended directly overlie, as far as possible, the outermost points of contact of the wire line with the respective traveling block sheaves, whereby to maintain the various runs of the wire line vertical and to reduce wear on the line as it engages and passes over the various sheaves.

Another object is to employ in conjunction with the side-opening traveling block an auxiliary hoisting device or grip to engage within the upper end of the section of pipe, such as a "stab" to be received within the collar at the upper end of the pipe, this auxiliary device being operable by the usual "cat line" and being movable independently during the intervals when the traveling block is being operated. The employment of such auxiliary hoisting means thus provides for conducting two operations at the same time, namely, those of positioning or removing the stand of pipe and of moving the traveling block within the vertical space occupied by the stand of pipe. It is therefore a further object of this invention to reduce the over-all time required heretofore by conducting simultaneously the different indicated operations.

Other objects and the various features of the invention will be apparent to those skilled in the art upon reference to the following specification and the accompanying drawings wherein certain embodiments are illustrated.

Figure 1:
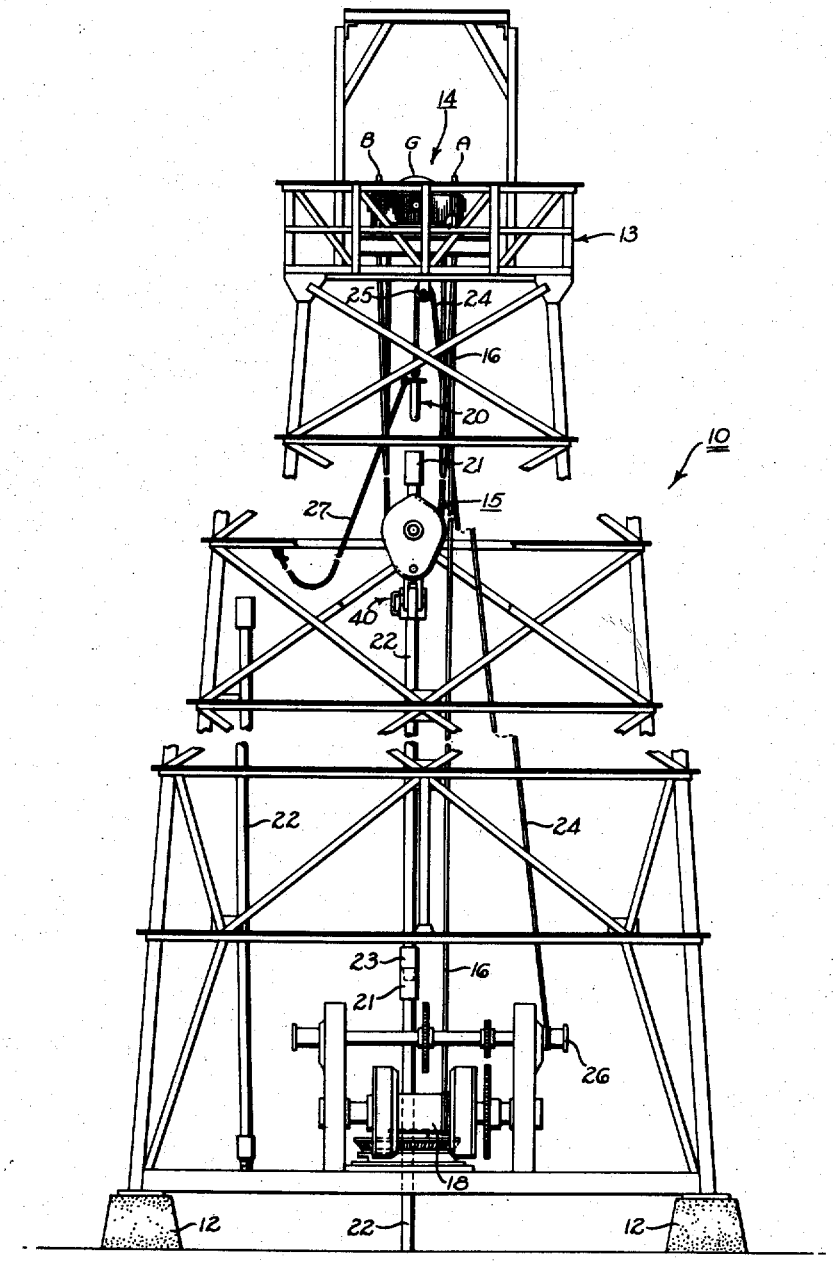
FIG. 1 is an elevation of a conventional derrick, [portion] *portions* being broken away, and showing the various parts of this invention in one operative relationship.

FIG. 1 illustrates the usual steel derrick 10 which is shown as being supported upon concrete piers 12 or other appropriate base, the derrick having on its top the usual crown platform 13 on which is mounted the water table framework carrying the crown block of the present invention, as indicated at 14, equipped with a plurality of sheaves respectively designated A, B, C, D, E, F and G from which there is suspended the side-opening traveling block 15 of this invention, such suspension being through the medium of a conventional wire line 16 extending downward through the derrick to the drum 18 of the usual draw works. Also shown suspended in the derrick 10 in FIG. 1 is a hoisting grip or stab 20 adapted to enter the collar 21 at the upper end of any length or stand of drill pipe 22 which has at its lower end a coupling 23 adapted to be threadedly engaged with the collar 21 of the stand of pipe 22 next below. The stab 20 is shown as being suspended by a cat line 24 running over a supporting pulley 25 and extending down to the usual cat head 26. A guide line 27 having one end attached to the derrick may be provided to control the stab 20. By this grip or stab arrangement a length of pipe 22 may be handled through the medium of the stab 20 and the cat line 24 during intervals when the traveling block is being hoisted during the running-in of pipe and being lowered when pulling out pipe, as more fully to be explained hereinafter.

Figure 3:
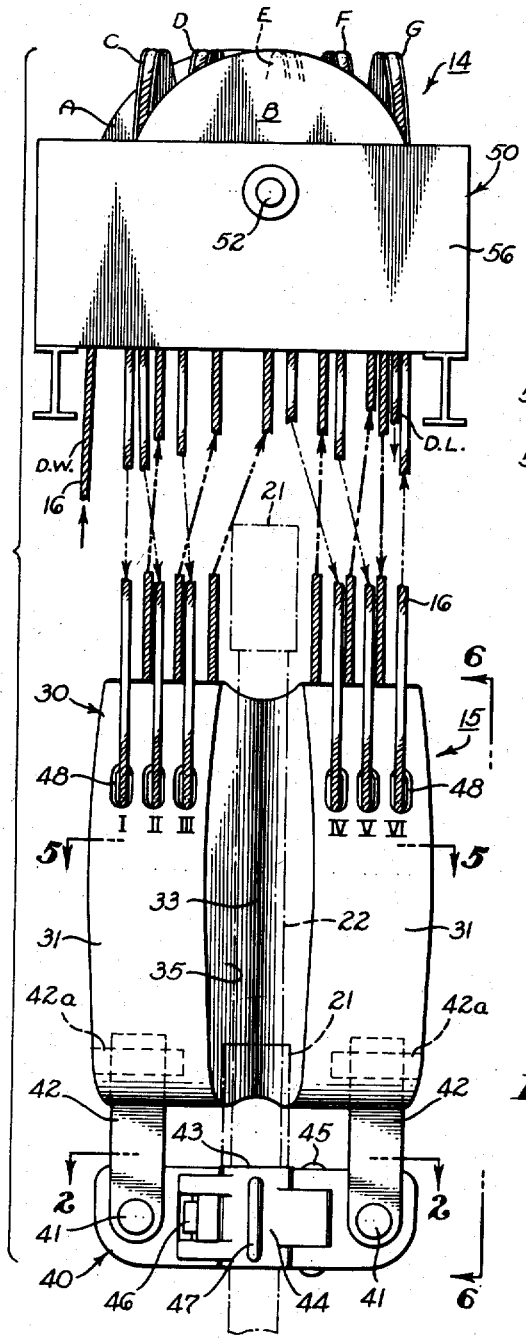
FIG. 3 is a face elevation of a side-opening traveling block of this invention in operative disposition below the crown block hereof.
Figure 5:
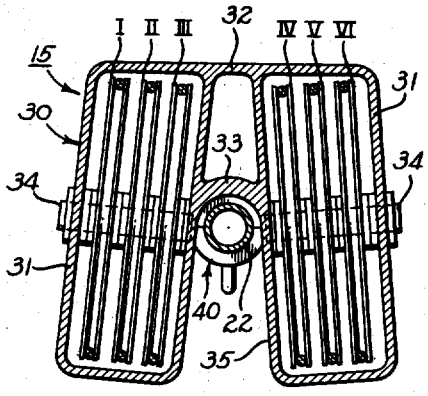
FIG. 5 is a cross section taken approximately on the line 5—5 of FIG. 3.
Figure 2:
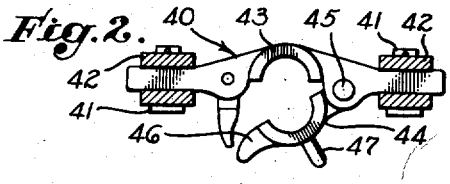
FIG. 2 is a horizontal section on an enlarged scale which is taken on the line 2—2 of FIG. 3 to show the plan of elevator carried at the lower end of the traveling block.

Having reference to FIGS. 3 and 5, the side-opening or gap-type traveling block 15 of this invention includes a cast casing 30 which is in the form of two diverging housing members 31 integrally connected by a back wall 32 and by an integral, vertical, partially cylindrical, central wall 33 which constitutes a vertical bearing face for a length of tubing. Each housing member 31, in the form shown, contains a group of sheaves mounted upon appropriate transverse shaft means 34. As seen from left to right in FIG. 5, these sheaves are respectively designated I, II, III, IV, V and VI. The housing members 31, being flared forward, as indicated, and therefore converging rearward, dispose the two groups of sheaves at a corresponding angle to each other, as a consequence of which the casing 30 has a generally U-shaped cross section and has a laterally directed side opening or gap 35. The angle of this gap is relatively small, and in any event is that which provides for a convenient shape of the casing 30 and provides a convenient flare for reception of a length of drill pipe 22 in some such relationship as shown in FIGS. 3 and 5. This angle may be in the order of 10° to 20°, for example.

Located at the lower end of the casing 30 is a horizontal, curved, pipe-supporting elevator or landing member 40, whose ends are supported on cross pins 41 carried in the lower ends of hangers 42 which are hinged by ears and through-pins 42a on the lower ends of the housing members 31 of the casing 30. Centrally of the landing member 40 and between the suspending members 42, there is disposed a horizontal seat 43 which may be approximately circular in extent, this seat 43 being adapted to provide a bearing surface for the overhanging portion of the collar 21 of a length of pipe 22. For the purpose of retaining pipe 22 and its collar 21 in position upon the seat 43 to raise and lower the pipe, a curved locking jaw 44 is employed. This jaw 44 is pivoted to the landing member 40 by a vertical pin 45 and is provided with latch means 46 to cooperate with corresponding latch means on the landing member 40 for retaining the parts in operative relationship during raising and lowering of stands of pipe or a pipe string in the well. The axis of the landing member 40 and its seat 43 corresponds with the axis of the curved central wall 33 of the traveling block casing 30 which should be the vertical axis of the traveling block itself. A handle 47 is conveniently provided upon the forward wall of the jaw 44 for purposes of manipulation, such jaw being relatively heavy in a tool of this type which must carry loads of a great many tons. If desired, the hangers 42 might be integral with the casing 30, as might the landing member 40. The size of the apparatus may be appreciated when it is considered that each of the traveling block and crown block sheaves may have a diameter in the order of five or six feet, varying with the service to be performed.

Figure 4:
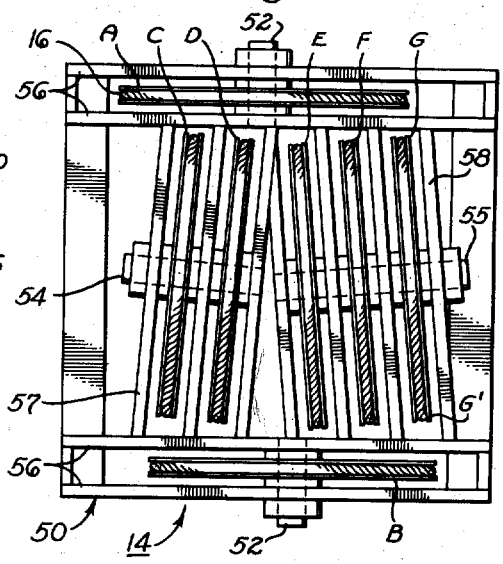
FIG. 4 is a plan view of the crown block of FIG. 3 and shows the relationship of the crown block sheaves.
Figure 6:
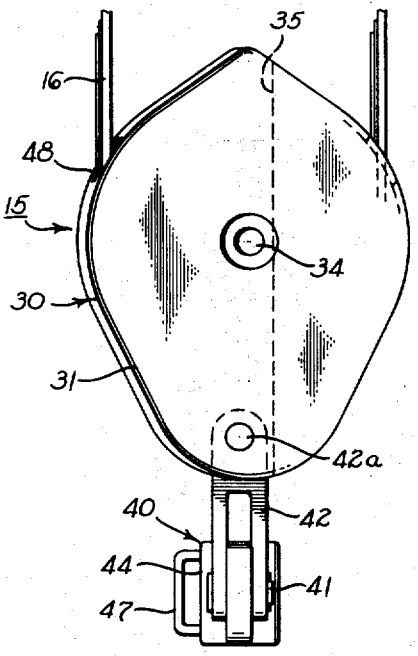
FIG. 6 is a side elevation of the traveling block as viewed from the line 6—6 of FIG. 3.

As seen from the side elevation of FIG. 6, the traveling block 15 tapers both upward and downward, and the upper sloping face at the front and back of both of the housing members 31 is apertured as indicated at 48 (FIG. 3) to provide for the passage of various runs of the wire line 16 extending vertically to and from the traveling block sheaves I, II, III, IV, V and VI. As previously indicated, the traveling block 15 in operation is disposed beneath the crown block 14, the sheaves of the traveling block and the crown block all being of the same diameter and positioned so that the runs of the wire line 16 between the sheaves of the respective blocks are disposed in almost exactly vertical position whereby to reduce wear on the line. This relationship of the sheaves of the two blocks is effected through the medium of the novel sheave arrangement in the traveling block 15, as above described, and a novel sheave arrangement in the crown block 14. In the latter arrangement, the axes of all of the sheaves A, B, C, D, E, F and G are horizontal and are disposed in the same horizontal plane. Since it is desirable to use a cross-over system of reeving the wire line 16 to balance the pull at the opposite sides of the traveling block 15, the two sheaves A and B, which constitute a spaced pair, are mounted at opposite sides of a supporting framework 50 of the crown block 14, and the remaining crown block sheaves C, D, E, F and G are disposed in a transverse direction and between the spaced sheaves A and B. The right edge of the sheave A, as seen in FIG. 4, is substantially in line, when the two blocks are in operative position, with the rear edge of the traveling block, so that, as the wire line 16 passes over the sheave A and downward to the sheave VI, it is for all practical purposes perpendicular. The line 16 then passes under the sheave VI and upward to the right side of the crown block sheave B, passing thence thereover and then downward to the forward side of the sheave I of the traveling block.

Figure 8:
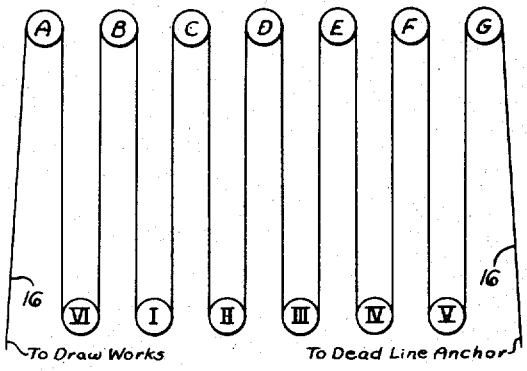
FIG. 8 is a diagrammatic showing of the reeving system to indicate the sequence of the various crown block and traveling block sheaves over which the crown block passes.

It will be noted that, in the arrangement of the sheaves as seen in FIGS. 4 and 5, the cross-over sheave A is located a little to the left in the framework 50, and the return cross-over sheave B is located a little to the right. In view of the angular disposition of the set of sheaves I, II, and III and the set of sheaves IV, V and VI in the traveling block, and the comparable angularities of the sheaves C, D, E, F and G, when the line 16 extends upward from the forward side of the sheave VI to the right side of the return cross-over sheave B, its position is substantially vertical because of the substantial alignment of the foremost part of the sheave VI with the edge of the return cross-over sheave B farthest to the right. Similarly, as the line 16 extends downward from the left side of the return cross-over sheave B, it extends substantially perpendicularly downward to the forward edge of the sheave I because of the fact that the left edge of the sheave B substantially overlies the forward edge of the sheave I. The four portions of the lines 16 fairleading to the two sheaves I and VI of the traveling block constitute the most important loops that control the tilting of the traveling block as the same are farthest from the vertical center line and hence constitute the greatest moment. The portion of the line 16 supporting the sheaves I and VI is closest to the draw works 18, resulting in a more equal pull. After the line 16 passes under the sheave I, it starts upward from the rear edge thereof to the rear edge of the crown block sheave C, the position of this run also being substantially vertical because the rearmost edges of these two sheaves are substantially in vertical alignment. The line 16, after reaching the sheave C, passes thereover and extends downward to the forward edge of the [crown block sheave 2] *traveling block sheave II*, the forward edges of these two sheaves C and II being in substantial vertical alignment. The rest of the reeving of the line 16 is indicated diagramamtically in FIG. 8. All of the runs of the line 16, as it passes successively from one sheave to another as indicated, are substantially vertical, the greatest probable discrepancy existing in the runs of the line from the crown block sheave E, which need not be perfect because the closer the sheaves are to the vertical center the less the tilting movement. The dead end of the line 16 is anchored at some suitable position on the derrick after leaving the top of the crown block sheave G.

From the foregoing, it will be apparent that, by having all of the sheaves of the two blocks of the same diameter, and offsetting the cross-over sheave A and the return cross-over sheave B respectively somewhat to the left and somewhat to the right as shown in FIG. 4, and by causing the live end of the line 16 to extend over the cross-over sheave A and down to the sheave VI at the right side of the traveling block 15, and after rising to the return cross-over sheave B and passing thereover and thence down and under the traveling block sheave I at the left of the traveling block, whence the line rises again to the crown block, the pull from the draw works is balanced as between the right and left sides of the traveling block 15. In addition, the described perpendicular positions of the various runs of the line 16 reduce line wear to the absolute minimum possible.

As indicated in FIG. 4, the various crown block sheaves are mounted on appropriate shafts, the sheaves A and B being carried upon short shafts 52, and the two groups of sheaves C, D and E, F, G being carried upon shafts 54 and 55 respectively which are generally transversely positioned with respect to the shafts 52. These shafts are variously mounted in plate members constituting portions of the framework, namely plate members 56 carrying and parallel to the shafts 52, transeversely and angularly disposed plate members 57 disposed at the sides of and parallel to the sheaves C and D and carrying the shaft 54, and plate members 58 at the sides of and parallel to the sheaves E, F and G and carrying the shaft 55. Also, as seen in FIG. 4, the far edges of the sheaves C, D, E, F and G are all equidistantly spaced, the near edges being spaced in two groups, namely, the near edges of sheaves C and D and the near edges of sheaves E, F and G, the one group as a whole diverging from the other group as a whole. This arrangement provides for fairleading of the runs of the line 16 between the crown block and the traveling block. The edge of the sheave G indicated as G′ leads to the anchor and therefore does not have to fairlead to any sheave groove of the traveling block.

Figure 9:
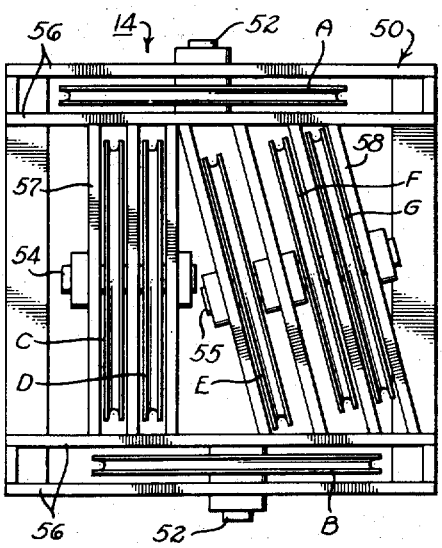
FIG. 9 shows a slight modification of the mounting and arrangement of the crown block sheaves.

In FIG. 9, a slight modification of the sheave arrangement of the crown is shown, the sheaves C and D and their supporting plates 57 being parallel to the adjacent end of the frame, and the other sheaves E, F and G and their supporting plate 58 being at a greater angle to the ends of the frame. The traveling block will then hang at a slight angle from the relative position of FIG. 5.

Figure 7:
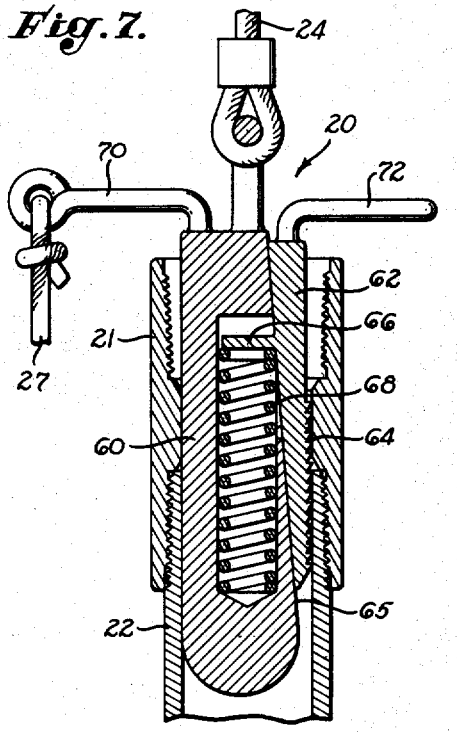
FIG. 7 is a vertical section of a "stab" operatively disposed in supporting relationship within the upper end of a length of drill pipe.

As previously explained, in order to free the traveling block 15 for operation during short intervals when disconnected stands of pipe 22 are to be handled, the mentioned grip or stab 20 and cat line 24 are employed to move such stands 22 [are] *as* required. The construction of this grip or stab 20 is illustrated in FIG. 7. It comprises an elongated generally cylindrical body member 60, adapted to be inserted into any collar 21 at the upper end of any length of drill pipe 22. The stab also includes a vertically movable gripping finger 62 provided on its outer face with a plurality of gripping teeth 64. The finger 62 is bevelled to slide upon a corresponding bevelled face 65, on the respective side of the body member 60. On the inner bevelled face of the finger 62 there is integrally provided an inwardly extending lug 66 which works in an axial bore receiving a coiled rear spring 68. The spring 68 acts to disengage the finger from the interior of the collar 21 or the pipe 22. However, so long as the weight of the pipe 22 is exerted upon the retention teeth 64 of the finger 62, the weight of the pipe being carried by the cat line 24 through the body member 60, the stab is retained automatically in operative position. When the section of pipe 22 is rested on the derrick floor or is rested with its bottom coupling 23 in engagement with an underlying collar 21, and draft on the cat line 24 is released, disengagement of the stab 20 may be effected by jerking the control line or guide line 27, which jerk is transmitted to the body member 60 through an overhanging laterally projecting arm 70. A similar arm 72 is provided on the top of the finger 62, and this arm is used to engage the teeth 64 with the collar 21 or pipe 22 when preparing to lift a stand of pipe 22. It is usually within reach of the operator if the stands of pipe are selected to be of approximately equal length; otherwise, resort to a jerk line will be required.

By the means described, when pulling pipe out of the hole for example, after a stand of pipe has been withdrawn from the hole and the pipe string landed upon conventional slips of the rotary table, the stab 20 is introduced into the upper end of the exposed stand of pipe preparatory to moving the stand as soon as it has been disconnected from the string of pipe hanging in the hole from the slips. During the interval of time while the thread is being disconnected, plus the time also consumed at present for setting the stand of pipe back in the derrick, the elevator can be released and the traveling block be lowered to the floor. Thus, the traveling block 15 and its elevator 40, 44 are free for engagement with the upper end of the suspended string whereby to lift the latter as soon as the disconnected stand has been moved over by the stab and cat line to stack the same in the derrick. In disconnecting the traveling block of this invention from the pipe 22, it is necessary merely to open the locking jaw 44 and swing the traveling block 15 laterally slightly away from the pipe. Similarly the traveling block 15 may be engaged with a length of pipe at any location merely by swinging the block, with the locking jaw 44 open, laterally into position to engage the central curved wall 33 with the adjacent side of the pipe. After the locking jaw 44 has been closed, elevation of the traveling block 15 brings the elevator seat 43 up into engagement with the pipe collar 21 so that the engaged pipe, whether it be a disconnected stand or the pipe string hanging in the hole, may be removed as required.

When running pipe into the hole, the next stand of pipe suspended from the stab 20 can be positioned over the center of the hole as soon as the last run-in stand is landed, and during the interval of time required to make up the connecting joint thread the traveling block can be elevated.

From the foregoing it will be apparent to those skilled in this art that, with the traveling block 15 hanging below the crown block by means of the various runs of the wire line 16, all of these runs will be almost exactly perpendicular, especially in view of the arrangement of the various sheaves described. Also, in view of the fact that all sheaves are of the same diameter, it will also be apparent to those skilled in the art that with this arrangement the wear of the wire line 16 on the sheaves is reduced to an absolute minimum. It is further evident that the traveling block may be connected to a length of pipe or disconnected therefrom by engagement or disengagement of the elevator member 40 and its locking jaw 44, and that, by reason of the side-opening gap 35, this may be done with a minimum of effort, hazard and manipulative skill. This is a great asset in drilling practices because it renders it less essential that the crewmen be highly skilled in drilling-rig technique of performing dangerous operations "on the fly" and including the manipulation of the traveling block. A further very important advantage of this improvement is due to the ever increasing depth of drilling and the increased weight of pipe to be handled, because of which hoisting equipment must be made more massive, the heaviest of such today being well beyond the strength of the crew members.

Since in a conventional drilling rig crew, or other deep well crew, there are always as many members required to handle the conventional traveling block as are required to handle both the present traveling block and the present grip or stab 20, it is apparent that, with the same crew, operations with the stab and with the traveling block may take place simultaneously, thereby greatly speeding up the handling of drill pipe or other pipe, either in a drilling well or in a producing well, without increasing the number in the crew.

I claim as my invention:

1. A traveling block and crown block combination including:

a traveling block having two vertical casing sections vertically connected at one side and providing between them at the other side a vertical, laterally directed opening extending [substantially the height] *vertically entirely through the block* [of the block] and opening out to the side thereof and adapted to receive pipe *extending above and below the block* by sidewise movement;

elevator means secured to the under side of said traveling block in alignment with said opening to engage and support pipe;

vertical sheaves mounted in both of said casing sections on horizontal axes;

a crown block to be disposed above said traveling block and having two sets of vertical sheaves disposed on horizontal axes all in the same horizontal plane, most sheaves of one set of crown block sheaves being respectively disposed in substantially the same vertical planes as the sheaves of the traveling block, the sheaves of the other set of crown block sheaves including a spaced pair disposed transversely to said one set and on opposite sides thereof, all of the sheaves of the two blocks having the same diameter; and a line running over the sheaves of the two blocks for supporting and operating the traveling block from the crown block in balanced relation.

2. A combination as in claim 1 including grip and cable means for supporting and handling pipe while said traveling block is operated.

3. A traveling block structure including:

two normally vertical housing members joined vertically at one side of the block and spaced vertically at the opposite side to produce a vertical, laterally-opening gap *extending vertically entirely through the block* for reception of pipe *extending above and below the block*;

elevator means secured at the under side of said housing members in alignment with said gap and adapted to engage and support pipe from its upper end, said gap being adapted for vertical sliding movement of said pipe therethrough and being also adapted for relative lateral movement of said pipe bodily to and from said gap *at a point along the length of the pipe intermediate its ends;* and vertical sheaves arranged in two spaced sets in said housing members to receive spaced runs of a cable in balanced relation on opposite sides of said gap.

4. A structure as in claim 3 wherein each housing member and its set of sheaves is disposed at angle to the other housing member and its sheaves whereby the walls of said gap flare outward to facilitate reception of a pipe.

5. A structure as in claim 3 including a vertical bearing wall at the back of said gap to engage said pipe, said elevator means having a horizontal seat centered with respect to the axis of said bearing wall to support said pipe, said elevator means having a closing jaw to retain supported pipe on said seat.

6. A traveling block including:

two vertical housing members;

vertical sheaves journalled in each housing member, said members being disposed at an angle to each other to provide a flaring, laterally-opening vertical gap *extending vertically entirely through the block* to [receive] *allow* pipe *extending above and below the block to be* moved laterally [thereinto from the outside of the block] *into and out of the gap*;

wall means joining said members at the side opposite said gap;

an approximately central, vertical, curved wall means connecting intermediate portions of said vertical housing members and providing a bearing wall for a vertical pipe disposed in said vertical gap and along which wall said pipe may slide *as the block moves vertically relative to the pipe*;

supporting means fixed to the lower portions of said housing members and having a horizontal pipe seat whose axis is substantially aligned with the axis of said curved wall means.

7. A traveling block including:

a casing having vertical housing members joined vertically at one side of the casing and separated at the opposite side for providing a vertical, laterally opening gap into which vertically disposed pipe may be passed laterally at any place along the length of the pipe;

groups of sheaves positioned in said housing members and spaced by reason of said gap between said members; and a pipe hanger carried by said casing at one end and having a supporting seat open at one side to receive said pipe upon said lateral passage.

8. A block as in claim 7 wherein said casing has an axis extending vertically through the inner portion of said gap and substantially coincidentally with the axis of pipe in said gap, said seat having an axis substantially coincident with the axes of said casing and said pipe.

9. In combination: a crown block having a pair of spaced parallel vertical cross-over sheaves and a plurality of vertical sheaves arranged at angles to one another and disposed transversely between said parallel sheaves;

a traveling block disposed directly below said crown block and having a plurality of vertical sheaves disposed transversely to said parallel sheaves of said crown block and arranged in plural diverging groups providing a laterally directed side opening between them at one side of the traveling block, *said opening extending vertically entirely through the block* to receive a pipe *extending above and below the block and* introduced *into the opening* from the respective side, all of said sheaves being of the same size;

and a cable extending over the sheaves of the two blocks and supporting the traveling block from the crown block, said equal sheave sizes and angularity of said sheaves of the two blocks resulting in substantially vertical disposition of all runs of the cable between said sheaves of the two blocks.

10. A combination as in claim 9 wherein said cable passes over one of said parallel cross-over sheaves to one side of the crown block, thence downward to and under the traveling block sheave at the corresponding side of the traveling block, thence upward to and over the other crossover sheave to the other side of the crown block, thence downward to and under the traveling block sheave at the other side of the traveling block, thence upward to an overlying transverse crown block sheave, thence downward to and under an intermediate traveling block sheave, and thence successively upward and over and downward and under the remaining crown block and traveling block sheaves.

11. In combination: a crown block having a pair of spaced parallel vertical cross over sheaves and a plurality of vertical sheaves disposed transversely between said parallel sheaves and arranged in two groups at an acute angle to one another;

a traveling block disposed directly below said crown block and having a plurality of vertical sheaves disposed transversely to said parallel sheaves of said crown block and arranged in two groups at an acute angle to one another corresponding generally with the acute angle of said two groups of sheaves of the crown block, said traveling block having two vertically extending housing portions joined verticlaly at one side and carrying respectively the two groups of angularly disposed sheaves, said two housing portions being arranged on substantially the same angle as the acute angle between the respective sheave groups, there being a vertically extending passage between said two housing portions at the diverging side of said angle and extending *vertically entirely through* [from top to bottom of] said traveling block and opening laterally from the traveling block from top to bottom whereby a vertically extending length of pipe *extending above and below the block* may be moved laterally from outside the traveling block into said passage to be supoprted by said traveling block;

elevator means carried by said traveling block adjacent its vertical axis and in alignment with an inner vertically extending portion of said passage; and a cable extending over the sheaves of the two blocks and supporting the traveling block from the crown block, the runs of said cable between the corresponding sheaves of the two blocks extending substantially vertically by reason of the angular relationships between the various groups of sheaves.

12. A combination as in claim 11 wherein all of said sheaves are of substantially the same size whereby said runs of said cable extend substantially parallel to one another.

13. A combination as in claim 11 wherein the axes of all the crown block sheaves are all in the same horizontal plane, and the axes of all the traveling block sheaves are in the same horizontal plane.

References Cited by the Examiner

The following references, cited by the Examiner, are of record in the patented file of this patent or the original patent.

UNITED STATES PATENTS

| | | | |
|---|---|---|---|
| 1,767,325 | 6/30 | Taylor | 294—82 |
| 1,910,173 | 5/33 | Lain et al. | 254—190 |
| 1,928,958 | 10/33 | Young et al. | 254—190 |
| 2,065,781 | 12/36 | Wilson | 24—249 |
| 2,259,253 | 10/41 | Kozlovskis | 254—188 |
| 2,341,225 | 2/44 | MacClatchie | 254—190 |
| 2,474,846 | 7/49 | Johns | 294—82 |

SAMUEL F. COLEMAN, *Primary Examiner.*